(12) United States Patent
Gloster et al.

(10) Patent No.: US 9,111,068 B2
(45) Date of Patent: Aug. 18, 2015

(54) MULTIPLE-MEMORY APPLICATION-SPECIFIC DIGITAL SIGNAL PROCESSOR

(75) Inventors: Clay S. Gloster, McLeansville, NC (US); Wanda D. Gay, Richmond, VA (US); Michaela E. Amoo, Silver Spring, MD (US)

(73) Assignee: HOWARD UNIVERSITY, Washington, DC (US)

( * ) Notice: Subject to any disclaimer, the term of this patent is extended or adjusted under 35 U.S.C. 154(b) by 649 days.

(21) Appl. No.: 12/954,479

(22) Filed: Nov. 24, 2010

(65) Prior Publication Data
US 2011/0167225 A1 Jul. 7, 2011

Related U.S. Application Data

(60) Provisional application No. 61/264,334, filed on Nov. 25, 2009.

(51) Int. Cl.
| | |
|---|---|
| *G06F 9/30* | (2006.01) |
| *G06F 9/40* | (2006.01) |
| *G06F 15/00* | (2006.01) |
| *G06F 15/78* | (2006.01) |

(52) U.S. Cl.
CPC ........ *G06F 15/7871* (2013.01); *G06F 15/7885* (2013.01)

(58) Field of Classification Search
None
See application file for complete search history.

(56) References Cited

U.S. PATENT DOCUMENTS

| | | |
|---|---|---|
| 5,550,839 A | 8/1996 | Buch et al. |
| 5,991,908 A | 11/1999 | Baxter et al. |

(Continued)

FOREIGN PATENT DOCUMENTS

| | | |
|---|---|---|
| JP | 2001-500682 A | 1/2001 |
| JP | 2004-533672 A | 11/2004 |

(Continued)

OTHER PUBLICATIONS

Gloster, Jr.; *Floating Point Functional Cores for Reconfigurable Computing System*; http://www.esto.nasa.gov/conferences/estc2003/papers/A5P3(Gloster).pdf; 2003; Earth Science Technology Conference (ESTC); Jun. 24-26, 2003.

(Continued)

*Primary Examiner* — Corey S Faherty
(74) *Attorney, Agent, or Firm* — Fitch, Even, Tabin & Flannery, LLP

(57) ABSTRACT

An integrated circuit device is provided comprising a circuit board and one or more digital signal processors implemented thereon. The digital signal processor comprises a data unit comprising a function core configured to perform a specific mathematical expression in order to perform at least a portion of a specific application and an instruction memory storing one or more instructions configured to send commands to the control unit and the data unit to perform the specific application, and a control unit configured to control the flow of data between a plurality of memory banks and the function core for performing the specific application, and the plurality of memory banks coupled to each of the one or more digital signal processors and comprising at least two or more local memory banks integrated onto the circuit board.

14 Claims, 11 Drawing Sheets

(56) References Cited

U.S. PATENT DOCUMENTS

| | | | |
|---|---|---|---|
| 6,047,115 | A | 4/2000 | Mohan et al. |
| 6,144,220 | A | 11/2000 | Young |
| 6,353,921 | B1 | 3/2002 | Law et al. |
| 6,748,577 | B2 | 6/2004 | Bal |
| 6,868,017 | B2 | 3/2005 | Ikeda |
| 7,133,822 | B1 | 11/2006 | Jacobson |
| 7,302,667 | B1 | 11/2007 | Pritchard |
| 7,421,524 | B2 | 9/2008 | Huppenthal et al. |
| 7,546,572 | B1 | 6/2009 | Ballagh et al. |
| 2002/0170030 | A1 | 11/2002 | Halcomb et al. |
| 2003/0005402 | A1 | 1/2003 | Bal |
| 2006/0004997 | A1 | 1/2006 | Mykland |

FOREIGN PATENT DOCUMENTS

| | | | |
|---|---|---|---|
| WO | | 02-071209 A2 | 9/2002 |
| WO | WO 2011-066459 A2 | | 6/2011 |

OTHER PUBLICATIONS

PCT; App. No. PCT/US2010/058100; International Search Report mailed Jul. 25, 2011.

PCT; App. No. PCT/US2010/058100; Written Opinion mailed Jul. 25, 2011.

Annapolis Micro Systems, Inc., "Wildstar II for PCI," published at least on or before May 2012, pp. 1-4, Annapolis Micro Systems, Inc., Annapolis, MD.

Annapolis Micro Systems, Inc., "Wildstar II for PCI," Dec. 10, 2008, pp. 1-2, published at http://web.archive.org/web/20081210212257/http://www.annapmicro.com/wsiipci.html.

Gay, Wanda Denise; *Optimization Tools and Techniques for Configurable Digital Signal Processor Synthesis*; 2008 Doctoral Dissertation; 153 pgs.; Howard University; Washington, DC, USA.

Gloster, Jr. et al.; *Optimizing the Design of a Configurable Digital Signal Processor for Accelerated Execution of the 2-D Discrete Cosine Transform*; Proceedings of the 39$^{th}$ Hawaii International Conference on System Sciences; 2006; pp. 1-8; IEEE.

Leupers et al.; *Variable Partitioning for Dual Memory Bank DSPS*; University of Dortmund; Dept. of Computer Science 12; pp. 1121-1124; IEEE; Dortmund, Germany.

Saghir et al.; *Exploiting Dual Data-Memory Banks in Digital Signal Processors*; Department of Electrical and Computer Engineering, University of Toronto; ASPLOS VII; Oct. 1996; pp. 234-243; Massachusetts, USA.

Xue et al.; *Address Assignment Sensitive Variable Partitioning and Scheduling for DSPS with Multiple Memory Banks*; 2008; pp. 1453-1456; IEEE.

Zhuge et al.; *Performance Optimization of Multiple Memory Architectures for DSP*; Department of Computer Science, University of Texas at Dallas; 2002; pp. 469-472; IEEE.

Annapolis Micro Systems, Inc.; *FIREBIRD for PCI Processing Board*; published at least as of Oct. 18, 2006 at http://web.archive.org/web/20061018030116/http://www.annapmicro.com/fbpci.html; copyright 2005; 2 pages; Annapolis Micro Systems, Inc.; Annapolis, MD.

Annapolis Micro Systems, Inc.; *FIREBIRD for PCI High Speed Digital Signal Processing Board, Data Sheet*; published at least as of Nov. 2, 2006 at http://web.archive.org/web/20061102221007/http://www.annapmicro.com/datasheets/firebirdpci_markdata_12733_1_10.pdf; copyright 2000-2003; 2 pages; Annapolis Micro Systems, Inc.; Annapolis, MD.

Annapolis Micro Systems, Inc.; *FIREBIRD Hardware Reference Manual*; published at least as of Oct. 18, 2006 at http://web.archive.org/web/20061018031516/http://www.annapmicro.com/manuals/firebird_hwrefmanual_v3.0.pdf; copyright 2000-2004, 234 pages; Revision 3.0; Annapolis Micro Systems, Inc.; Annapolis, MD.

Annapolis Micro Systems, Inc.; *WILDSTAR Software Reference Manual*; published at least as of Oct. 18, 2006 at http://web.archive.org/web/20061018031359/http://www.annapmicro.com/manuals/wildstar_swrefmanual_v2.4.pdf; copyright 2000-2004; 166 pages; Revision 2.4; Annapolis Micro Systems, Inc; Annapolis, MD.

JPO; App. No. 2012-541208; Office Action mailed Oct. 6, 2014.

EPO; App. No. 1083379.7; Extended European Search Report mailed Apr. 16, 2015.

JPO; App. No. 2012-541208; Office Action mailed Jul. 6, 2015.

MULTIPLE-MEMORY APPLICATION-SPECIFIC DIGITAL SIGNAL PROCESSOR

This application claims the benefit of U.S. Provisional Application No. 61/264,334, filed Nov. 25, 2009, entitled "Multiple-Memory Application-Specific Digital Signal Processor", the entire content and disclosure of which is hereby incorporated by reference herein in its entirety.

BACKGROUND OF THE INVENTION

1. Field of the Invention

The present invention relates generally to Digital Signal Processors, and more specifically to Application Specific Digital Signal Processors.

2. Discussion of the Related Art

Over the past decade, digital signal processors (DSP) have become increasingly popular for implementing embedded applications in high-volume consumer products. While these DSPs provide the high performance necessary for embedded applications at low costs, there is still a need for DSPs that can provide higher performance and speed while maintaining the precision and accuracy provided by existing processors. These new processors can provide low cost alternatives to supercomputers for high performance computing applications.

SUMMARY OF THE INVENTION

Several embodiments of the invention advantageously address the needs above as well as other needs by providing an integrated circuit device comprising a digital signal processor (ASDSP) that executes a specific digital signal processing algorithm.

In one embodiment, an integrated circuit device, comprises a circuit board and one or more digital signal processors implemented thereon, each comprising a data unit comprising a function core configured to perform a specific mathematical expression in order to perform at least a portion of a specific application and an instruction memory storing one or more instructions configured to send commands to the control unit and the data unit to perform the specific application and the control unit configured to control the flow of data between a plurality of memory banks and the function core for performing the specific application, and the plurality of memory banks coupled to each of the one or more digital signal processors and comprising at least two or more local memory banks integrated onto the circuit board.

In another embodiment, a method comprises generating one or more digital signal processors, wherein generating each of the one or more digital signal processors comprises generating a data unit comprising generating a function core configured to perform a specific mathematical expression in order to perform at least a portion of a specific application and generating an instruction memory storing one or more instructions configured to send commands to the control unit and the data unit to perform the specific application, generating the control unit configured to control the flow of data between a plurality of memory banks and the function core for performing the specific application, loading the one or more digital signal processors onto a circuit board and coupling each of the one or more digital signal processors to the plurality of memory banks comprising coupling each of the one or more digital signal processors to at least two or more local memory banks integrated onto the circuit board.

In yet another embodiment, a tangible computer-readable storage medium having computer readable instructions for performing a method comprises generating one or more digital signal processors, wherein generating each of the one or more digital signal processors comprises generating a data unit comprising generating a function core configured to perform a specific mathematical expression in order to perform at least a portion of a specific application and generating an instruction memory storing one or more instructions configured to send commands to the control unit and the data unit to perform the specific application, generating the control unit configured to control the flow of data between a plurality of memory banks and the function core for performing the specific application, loading the one or more digital signal processors onto a circuit board and coupling each of the one or more digital signal processors to the plurality of memory banks comprising coupling the data unit of each of the one or more digital signal processors to at least two or more local memory banks integrated onto the circuit board.

BRIEF DESCRIPTION OF THE DRAWINGS

Aspects, features and advantages of several embodiments of the present invention will be more apparent from the following more particular description thereof, presented in conjunction with the following drawings.

Figure 1:
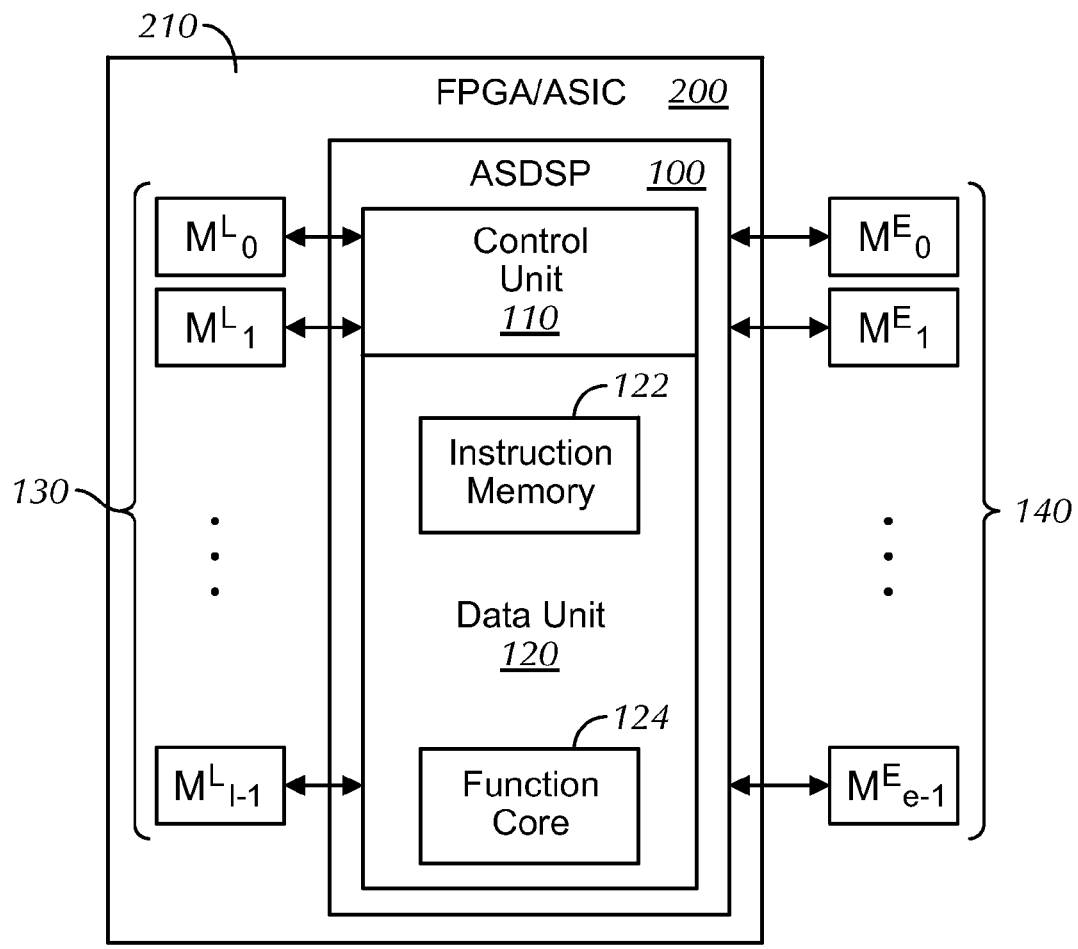
FIG. 1 illustrates an exemplary multiple memory, Application Specific Digital Signal Processor (ASDSP), according to several embodiments of the invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common, but well-understood, elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

According to several embodiments, an integrated circuit device is provided comprising a circuit board and one or more digital signal processors implemented thereon. In some embodiments, the digital signal processor comprises a data unit comprising a function core configured to perform a specific mathematical expression and an instruction memory configured to store instructions that send commands to the control unit and the data unit to perform a specific application, a plurality of memory banks coupled to the data unit and comprising at least two or more local memory banks integrated onto the circuit board and a control unit configured to control the flow of data between the plurality of memory banks and the function core for performing the specific application.

An application-specific digital signal processor (ASDSP) is a high-performance, floating-point or fixed-point, vector processor that executes a specific digital signal processing algorithm. ASDSPs are used to alleviate bottlenecks in application software by replacing computationally intense portions of the application with custom hardware. In one embodiment, the Reconfigurable Computing Compilation (RCC) System is the Remote and Reconfigurable Environment (RARE) tool that performs this procedure.

In one or more embodiments, as described below, the digital signal processor is divided into two major components: the control unit and the data unit. In some embodiments both the complete function core, which performs the primitive mathematical computations of the DSP algorithm, and the instruction memory, which houses the processor's instructions, are components of the data unit.

In one or more embodiments, ASDSPs are stored in a central processor library. Each ASDSP is stored as an FPGA bit stream. In one or more embodiments, a module definition file that describes the ASDSP's function and other attributes may be maintained so that the system can utilize the processor. In these embodiments, both the ASDSP definition file and the FPGA configuration files may be needed to use the ASDSP on the FPGA board.

FIG. 1 illustrates a multiple memory, Application Specific Digital Signal Processor (ASDSP) 100, according to one embodiment. The multiple memory processor architecture of the ASDSP 100 is comprised of a control unit 110 and a data unit 120. In some embodiments, the data unit 120 includes an instruction memory 122 and a function core 124. The ASDSP 100 is connected directly to several memory banks, including one or more local memory banks 130 (for example memories $M^L_0$-$M^L_{l-1}$) and/or external memory banks 140 (for example memories $M^E_0$-$M^E_{e-1}$). In one embodiment, the ASDSP 100 is implemented onto an integrated circuit device 200, comprising a circuit board 210. In some embodiments, as illustrated in FIG. 1, for example, the architecture is implemented on a Field-Programmable Gate Array (FPGA) 200. In other embodiments, the ASDSP may be implemented on a masked programmable gate array or custom integrated circuit (not shown). As illustrated in FIG. 1, in one exemplary embodiment, the ASDSP 100 is loaded into the FPGA 200.

In one embodiment, ASDSPs are stored in a central processor library. Each ASDSP is stored as an FPGA bit stream. In some embodiments, a module definition file that describes the ASDSP's function and other attributes may be maintained to use the ASDSP on the FPGA board.

In one embodiment, the control unit 110 is one or more finite state machines that perform one or more tasks. For example, in one embodiment, the control unit 110 manages memory reads and writes, decodes the instruction, enables the function core to begin once the data is available, signals completion to the host, and/or returns control to the host processor. In one embodiment, the control unit 110 controls the flow of data through the ASDSP 100, managing the scheduling of the simultaneous reads and writes to multiple memory banks 130 and/or 140. In one embodiment, the control unit 110 provides a constant stream of input data to the function core 124, while managing the queuing of output data to multiple memory banks 130 and/or 140. In other embodiments, the control unit 110 additionally or alternatively manages when the function core 124 is active/idle. In one embodiment, the control unit 110 is a simple finite state machine that is very similar for ASDSPs with function cores containing the same number of inputs and outputs.

According to several embodiments, the data unit 120 handles the information and comprises standard processor components such as registers, a program counter, an instruction register, memory address registers, counters and/or function cores. In one embodiment, the data unit 110 contains one or more function cores 124. In one exemplary embodiment, as illustrated in FIG. 1, the data unit 120 contains the instruction memory 122 and the function core 124. In one embodiment, the instruction memory 122 comprises one or more instructions from an instruction set. According to one or more embodiments, each instruction found in the instruction memory 122 is fetched, decoded, and executed. In one embodiment, the instruction set contains at least two instructions and is encoded using the minimum number of bits. In such embodiment, one instruction is for the particular application and the other is to halt the processor. The halt instruction returns control of program execution back over to the operating system or the host processor. In some embodiments, the instruction set may further contain instructions for loading and storing data in internal registers as well as others.

In one embodiment, each application defines it own ASDSP, therefore, the same op-codes can be reused for different instructions. For example, the ASDSPs for implementing the Fast Fourier Transform (FFT) and the Discrete Cosine Transform (DCT) may both contain two instructions with exactly the same op-codes. That is, in some embodiments, two ASDSPs with different function cores 124 can reuse the same op-codes for two extremely different arithmetic expressions. In one or more embodiments, the instruction set op-codes on the ASDSP may be reused entirely or partially for another ASDSP.

In some embodiments, the small instruction set contributes to maximizing system clock speed. Due to the small number of instructions, the instruction decode logic is minimized and does not contribute to the delay on the critical path of the design. In several embodiments, the functionality of the reduced set of instructions is achieved by the use of the application-specific function core 124.

Furthermore, as illustrated in FIG. 1 in several embodiments, the instruction memory 122 is configured as part of the data unit 120 and is separate from the data memory banks 130 and 140. This exemplary configuration allows for faster reads from the instruction memory and therefore contributes to the speed of the ASDSP.

In some embodiments, the function core 124 comprises the computational component of the data unit 120. In one embodiment, the function core 124 is similar to an arithmetic logic unit (ALU) but it only performs fixed or floating-point operations necessary for the given application. In some embodiments, the function core 124 is highly pipelined, has multiple inputs and outputs, and effectively computes complex arithmetic expressions, composed of lower level primitives, during each cycle once the pipeline is filled.

Figure 5:
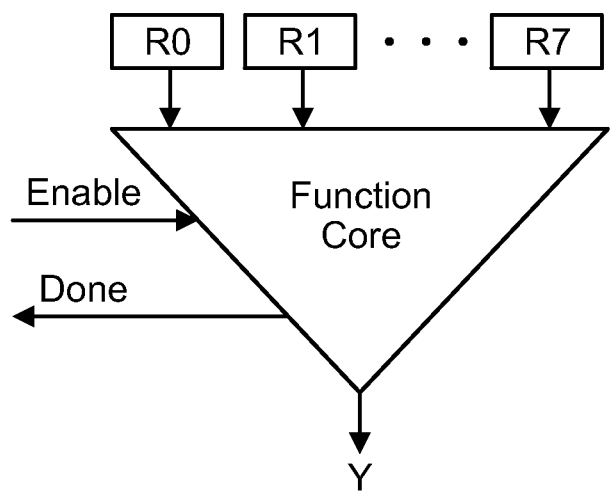
FIG. 5 illustrates an exemplary function core, according to several embodiments of the invention.
Figure 3B:
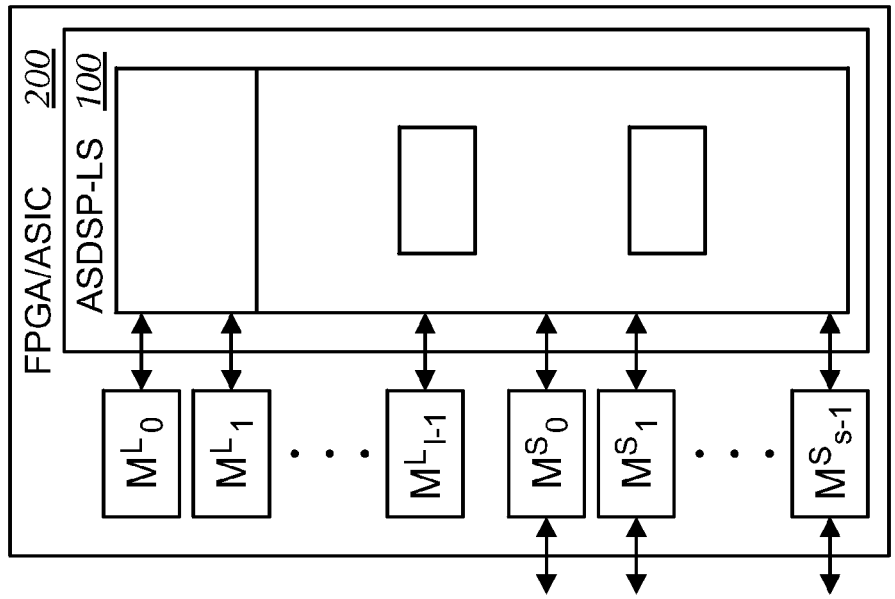
FIGS. 3A-3D illustrate four possible configurations of an interacting ASDSP, according to several embodiments of the invention.
Figure 3A:
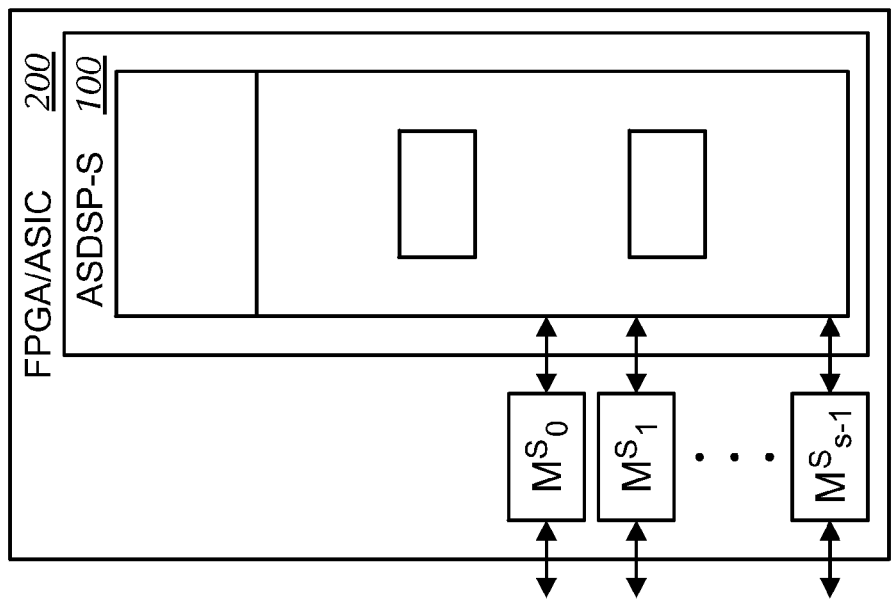
Figure 3D:
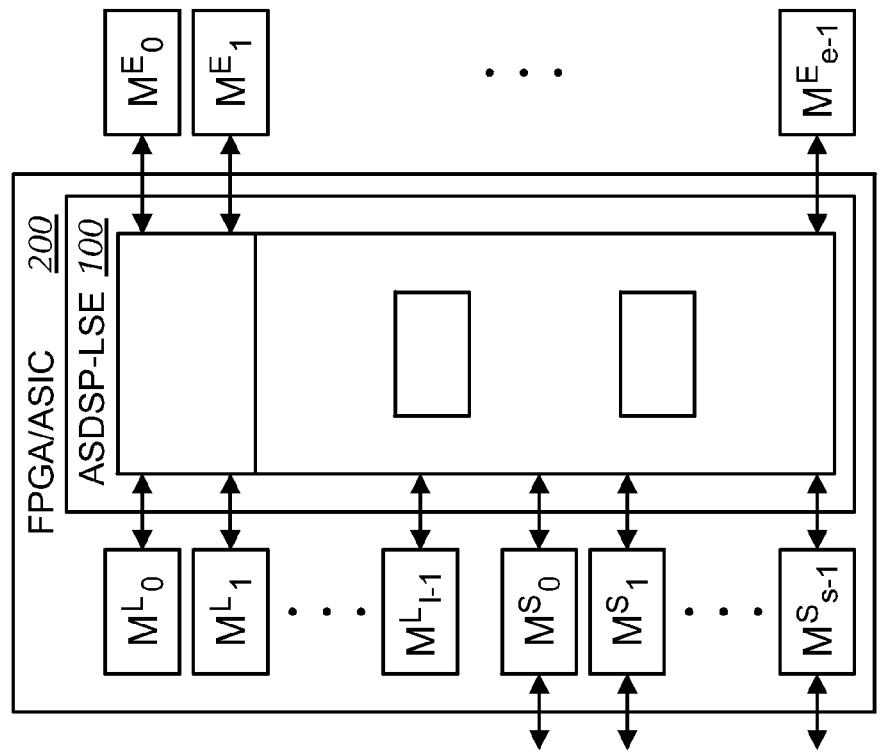
Figure 3C:
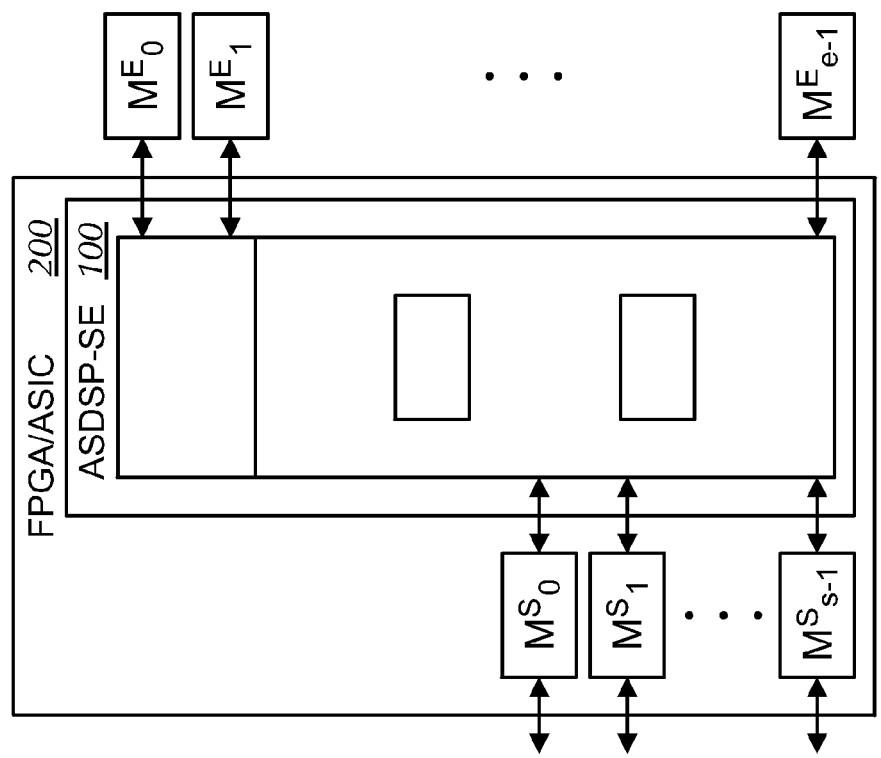

In several embodiments, function cores are used to execute fixed or floating-point vector operations. In one embodiment, the structure of function cores 124 may comprise n-inputs and a single output. FIG. 5 illustrates an exemplary function core 124 according to several embodiments, wherein the function core 124 comprises 8 inputs being supplied by registers R0-R7 and a single output Y. In one embodiment, the function core 124 may be pipelined and made up of two or more function cores, similar to the function core as illustrated in FIG. 5. In one embodiment, the function core 124 may have up to n inputs and m outputs depending on the specific function being performed by the function core 124. In one embodiment, n and m are integers equal to or greater than 1. In one embodiment, each of the inputs and outputs of the function core are 32-bits.

Figure 6:
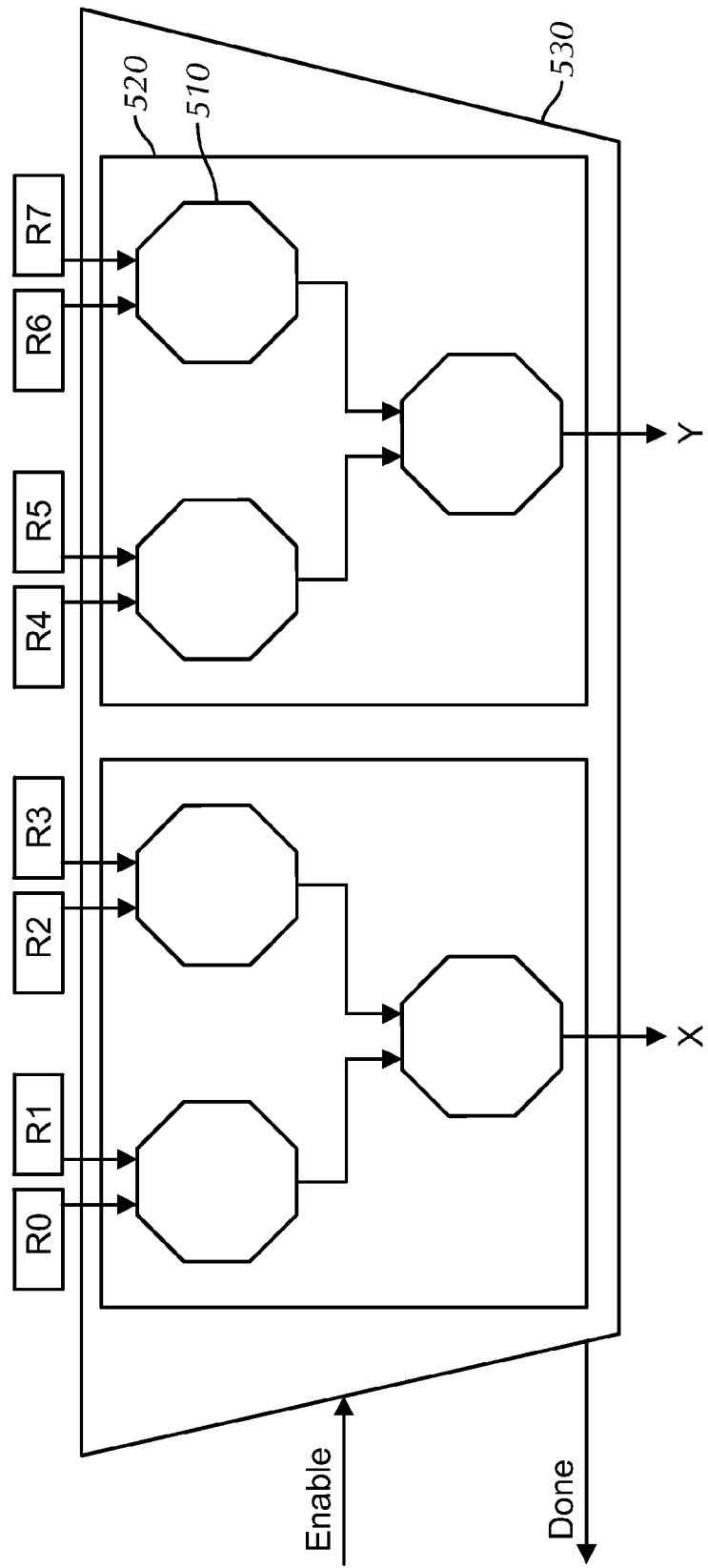
FIG. 6 illustrates another exemplary function core, according to several embodiments of the invention.

FIG. 6 illustrates yet another exemplary embodiment of a function core 124. In the embodiment illustrated in FIG. 6, the function core 124 contains one or more basic building blocks called fundamental function cores (FFCs) 510, each illustrated as an octagon in FIG. 6. In one embodiment, an FFC 510 is a pipelined, 32-bit floating-point, vector data processing unit that executes a particular arithmetic primitive such as addition, subtraction, multiplication or division. According to one embodiment, an FFC 510 executes a single fundamental operation which has 2 inputs and a single output. Each FFC 510 may be controlled via its enable and done pins. The enable pin indicates whether there is valid input data present on the inputs of the FFC 510. The enable pin also indicates that the primitive operation is to be initiated. The done pin indicates whether there is valid output data present. An FFC may further perform an execution delay to balance the architecture of the Basic Function Core (BFC). In one embodiment, the FFC 510 may be a balanced FFC, such that there is an equal number of pipeline stages on all paths through the FFC starting from a single input and ending at a single output. Additionally, in such embodiment, all paths from any input to any output contains an equal number of pipeline stages.

A BFC 520, illustrated in FIG. 6 as a rectangular unit, according to several embodiments, comprises two or more FFCs logically connected together to perform a more complex arithmetic operation. In some embodiments, the structure of the BFC 520 may be based on the computations in the principle computation loop of the original algorithm. Accordingly, in several embodiments, FFCs 520 are connected in a tree-like fashion to compute more complex functions such as a dot-product or even a signal processing transform.

The top or most complex level of the function core hierarchy is a complete function core (CFC) 530. The complete function core performs the entire computation of the original DSP algorithm for a designated ASDSP. In one embodiment, as illustrated in FIG. 6, the CFC 530 is the function core 124 illustrated in FIG. 1. As illustrated, the CFC 530 comprises 8 inputs provided by registers R0-R7 and 2 outputs X and Y. In one embodiment, each complete function core may comprise n inputs and m outputs, where n and m are integers greater than or equal to 1. In some embodiments, a CFC 530 is composed of one or more BFCs 520. In one embodiment, the number of BFCs in a CFC may be a function of the FPGA area and data memory size, focusing on the width of the data. That is, in one embodiment where the FPGA can only support a single BFC, the CFC may be equivalent to the BFC. However, in embodiments where the FPGA can support more than one BFC, then the CFC may be a set of BFCs.

In one embodiment, function core 124 is a floating-point processing unit. In some embodiments, the use of floating point arithmetic increases the accuracy obtained as a result of the processing in the digital signal processing algorithm and further allows hardware system debugging. In one embodiment for example, for debugging purposes, nodes in the hardware system can be checked against their corresponding line in a floating point software implementation of the same algorithm. One can easily verify the functionality of the hardware by checking the floating-point value produced by the software against that produced by the hardware version of the algorithm. If the two values are equal, there is no error in the hardware implementation. In another embodiment, function core 124 may be a fixed-point function core. As described above, in some embodiments, there can be several function cores in each ASDSP. Hence the total number of cycles required for completing a complex arithmetic computation may be significantly reduced because the hardware produces a result every clock cycle once the pipeline is filled.

In one embodiment, the number of memory banks 130 and 140 connected to the ASDSP can range from two to hundreds of memory banks. In one embodiment, the number of memory banks is at least greater than two. In another embodiment, the number of memory banks may be at least greater than ten, and in yet another embodiment the number of memory banks may be at least greater than 100. In one embodiment, the proposed ASDSP 100 would typically accommodate tens to hundreds of memory banks 130 and 140. The multi-memory architecture distinguishes the proposed architecture from traditional DSPs which typically have no more than one or two attached memory banks. That is, traditional processors are limited by the number of pins on the board and therefore are limited on the number of memory banks that can connect to each ASDSP. By utilizing local, on-board memory, the current exemplary embodiments allow for more reads per cycle, and therefore, increases the performance of ASDSPs in comparison to traditional processors. As illustrated in FIG. 1, the ASDSP may be connected to on-board or local memory banks 130. In one embodiment, as illustrated in FIG. 1, the ASDSP is further connected to external memory banks 140. In another embodiment, the ASDSP may be connected to only local memory banks 130 or external memory banks 140.

In some embodiments, the number of external memory banks 140 may be limited, for example, by the number of pins on the FPGA board and/or other structural limitations. However, the use of local memory banks 130 allows for accommodating large numbers of memory banks. In some embodiments, the accommodation of large numbers of memory banks allows for simultaneous read/writes from/to each memory bank 130 and/or 140. Hence, in one or more embodiments, the total number of cycles required for the computation, including memory accesses, may be significantly reduced.

In one embodiment, for example, where both external memory banks 140 and local memory banks 130 are used, the external memory banks may be used for initialization and for providing data to the local memory banks 130. In one embodiment, the number of the local memory banks connected to the ASDSP may be equal to the number of inputs and outputs of the function core. In some embodiments, 1 local memory banks 130 may be utilized such that for all of the reads and/or writes that may be possibly performed simultaneously there are memory banks 130 to provide data to the ASDSP 100. In such an embodiment, the local memory banks 130 may be fed with data from the external memory banks 140 and may further provide the data to the processor as required for performing the specific application of the ASDSP.

In one embodiment, FPGA 200 is used for implementation of the proposed multiple memory ASDSP 100. In one embodiment, the FPGA 200 contains hundreds of small memory banks called block RAMs. Rather than being connected to a single main memory, as is the case with traditional processors, the ASDSP 100 exploits it connections to many local memory banks 130, in addition to external memory banks 140, to significantly increase its input/output data bandwidth. In one embodiment, an ASDSP with n memory banks can perform n simultaneous reads/writes in a single clock cycle. In one or more embodiments, each of the memory banks can transfer 32 or 64-bits of data in a single clock cycle. Because the maximum clock rate of an FPGA is orders of magnitude slower than that of typical microprocessors, the use of the FPGA in several embodiments may further allow the ASDSP to require less power than typical processors.

In one or more embodiments, the combination of a control unit 110 and data unit 120 implemented on the FPGA constitutes the digital signal processor as illustrated. Computations are performed by the data unit 120 in conjunction with the control unit 110.

Accordingly, with regard to several embodiments, each ASDSP 100 contains the hardware necessary for communicating with multiple memory banks 130 and 140, and the function core hardware that computes the arithmetic expression that characterizes each particular application. In several embodiments, the ASDSP 100 has a small instruction set, includes an application specific function core, and can perform simultaneous read/wire operations to multiple memory banks.

Figure 2A:
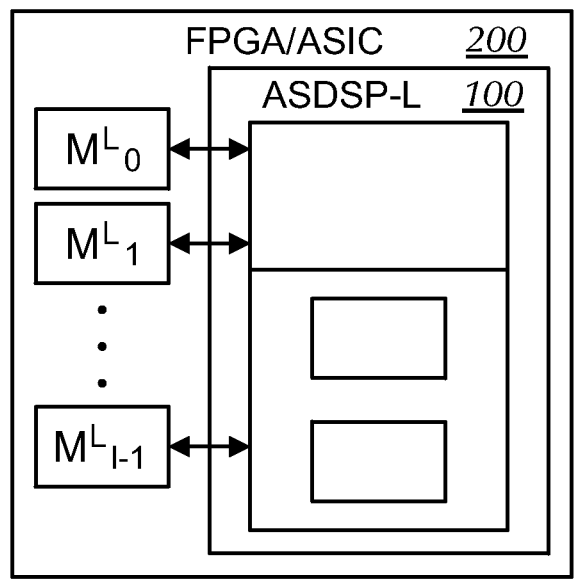
FIGS. 2A-2C illustrate three possible configurations of a non-interacting ASDSP, according to several embodiments of the invention.
Figure 2B:
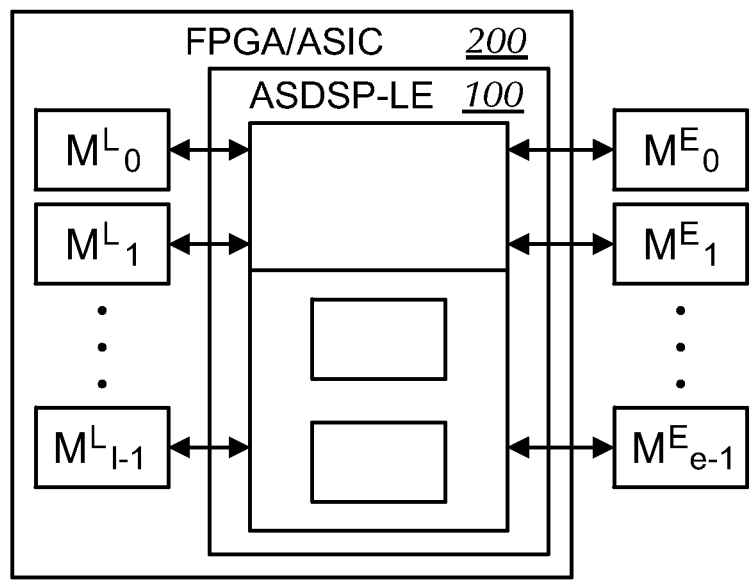
Figure 2C:
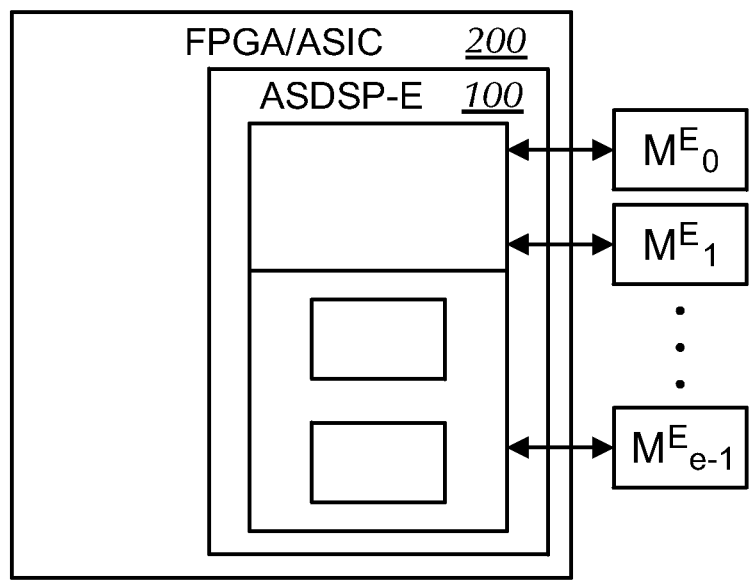

While ASDSP 100 of FIG. 1 is depicted as a non-interacting ASDSP in communication with both local and external memory banks, it should be understood that in several different embodiments, each ASDSP 100 may be configured as either a non-interacting or interacting ASDSP connected to local and/or external memory banks. FIGS. 2A-2C illustrate three possible configurations of a non-interacting ASDSP 100. In one embodiment, non interacting ASDSPs 100, i.e., ASDSPs which do not share memory banks with other ASDSPs, may be configured to be connected to local memory only (ASDSP-L), such as the ASDSP-L shown in FIG. 2A connected to a plurality of local memory banks $M^L_0$-$M^L_{1-1}$, both local and external memory (ASDSP-LE), such as the ASDSP-LE shown in FIG. 2B connected to a plurality of local memories $M^L_0$-$M^L_{1-1}$ and external memories $M^E_0$-$M^E_{e-1}$, or to be connected to external memory only (ASDSP-E), such as the ASDSP-E shown in FIG. 2C connected to a plurality of external memories $M^E_0$-$M^E_{e-1}$.

In another embodiment, the ASDSP may be configured as an interacting DSP wherein the ASDSP shares one or more of its memory banks with another ASDSP. FIGS. 3A-3D illustrate possible configurations of an interacting ASDSP 100 according to one or more embodiments. Interacting ASDSPs 100 may be configured such that each ASDSP 100 is connected to shared local memory only (ASDSP-S), such as the ASDSP-S shown in FIG. 3A connected to a plurality of shared local memories $M^S_0$-$M^S_{s-1}$, shared local as well as local memory not shared (ASDSP-LS), such as the ASDSP-LS shown in FIG. 3B connected to a plurality of shared local memories $M^S_0$-$M^S_{s-1}$ as well as non-shared local memories $M^L_0$-$M^L_{1-1}$, shared local as well as external memory (ASDSP-SE), such as the ASDSP-SE of FIG. 3C connected to a plurality of shared local memories $M^S_0$-$M^S_{s-1}$ as well as external memories $M^E_0$-$M^E_{e-1}$ or local, shared local, and external memory (ASDSP-LSE), such as the ASDSP-LSE shown in FIG. 3D connected to a plurality of shared local memories $M^S_0$-$M^S_{s-1}$ as well as non-shared local memories $M^L_0$-$M^L_{1-1}$ and external memories $M^E_0$-$M^E_{e-1}$.

Figure 4A:
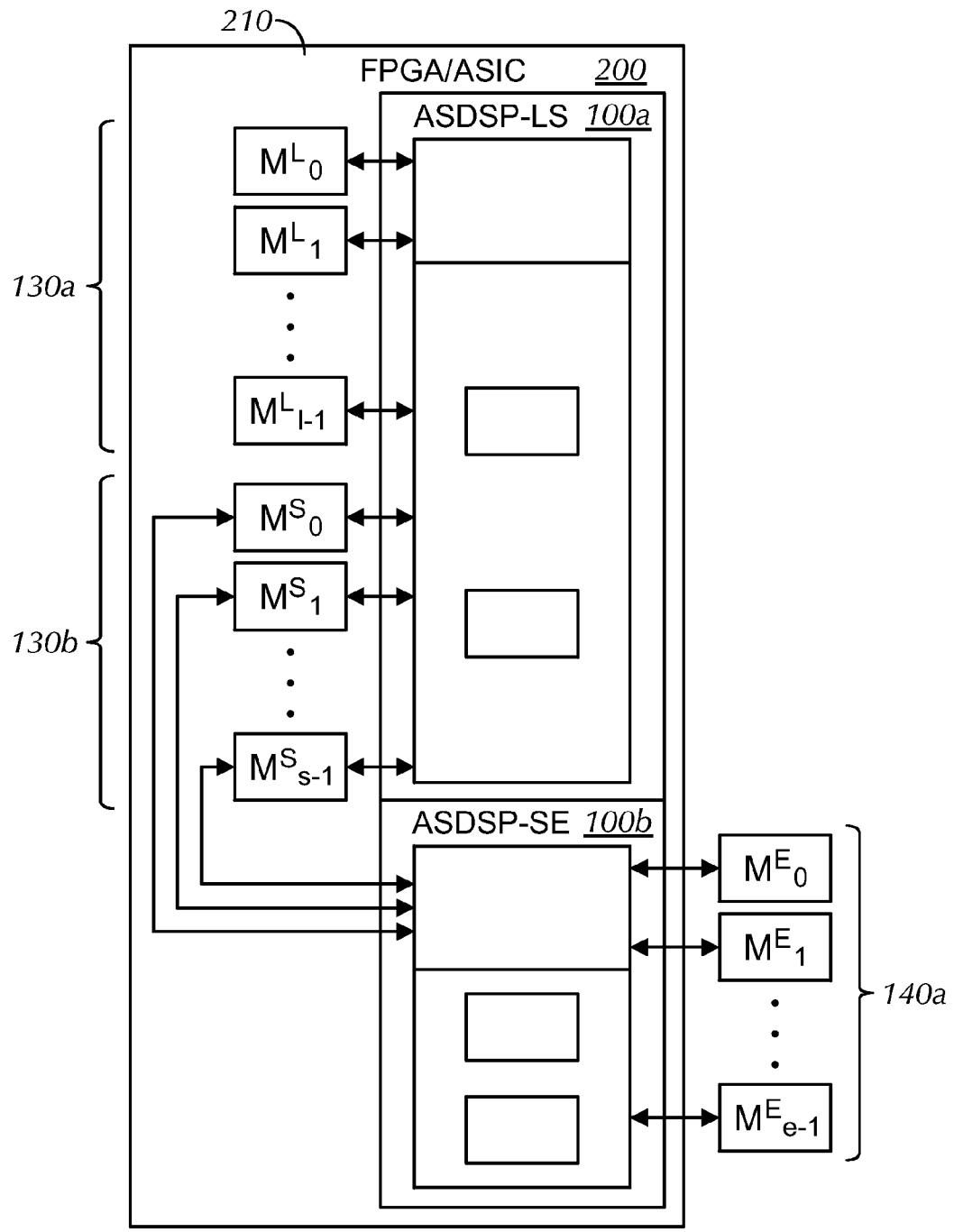
FIG. 4A illustrates an exemplary embodiment of a Field-Programmable Gate Array (FPGA) having multiple ASDSPs thereon, according to several embodiments of the invention.

In one embodiment, multiple interacting ASDSPs 100 may be integrated into the same FPGA 200. FIGS. 4A, 4B, 4C and 4D illustrate exemplary embodiments of an FPGA 200 having two or more ASDSPs 100 being placed thereon. FIG. 4A illustrates an FPGA 200 having a first ASDSP 100a, and a second ASDSP 100b placed thereon. In this exemplary embodiment, ASDSP 100a is illustrated as an ASDSP-LS having both unshared local memory banks 130a and shared local memory banks 130b. Furthermore, ASDSP 100b is illustrated as an ASDSP-SE in communication with the shared local memory banks 130b and external memory banks 140. Accordingly, in the exemplary embodiment of FIG. 4A, ASDSP 100a and 100b are interacting ASDSPs which share local memory banks 130b.

Figure 4B:
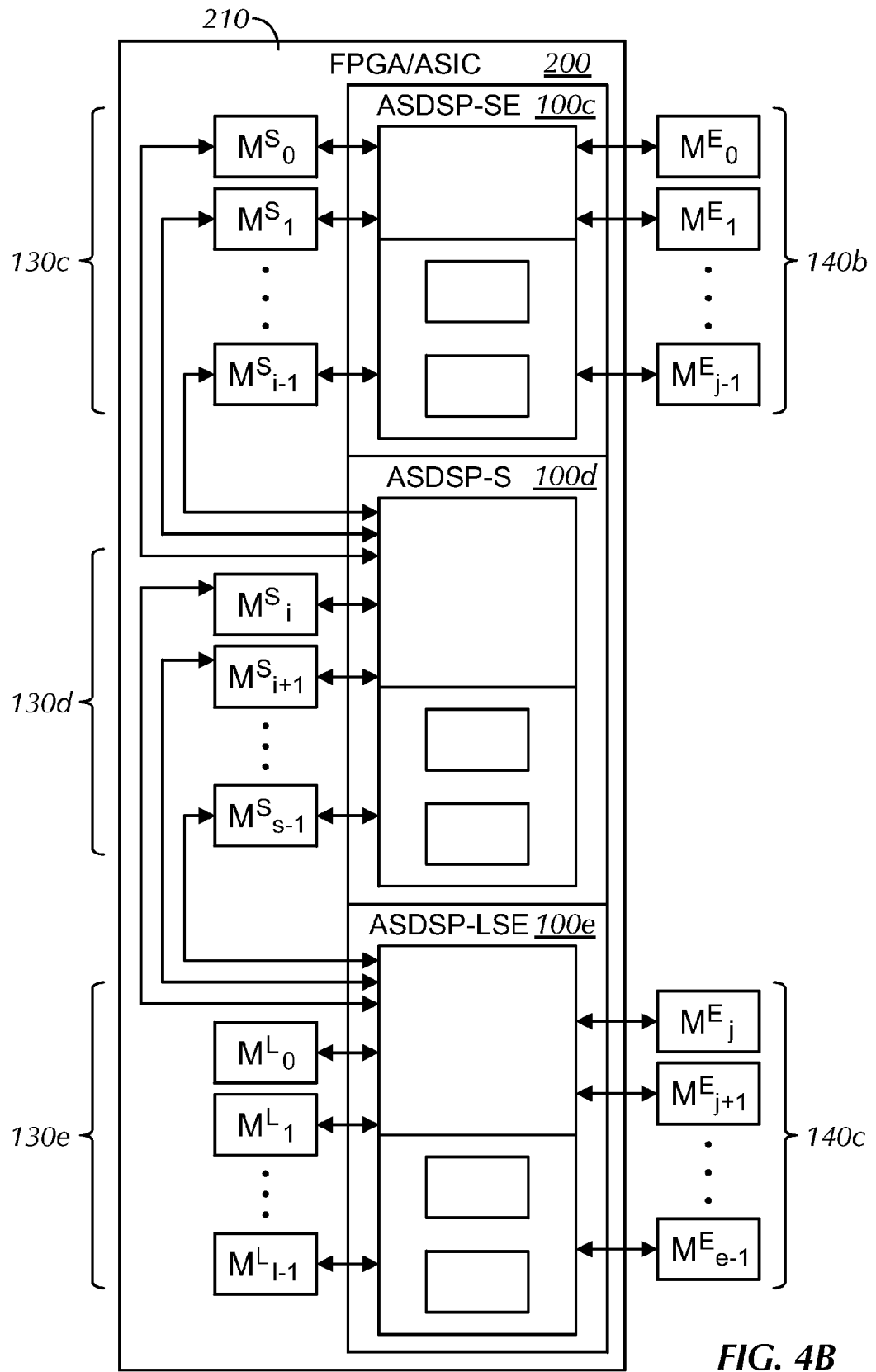
FIG. 4B illustrates a second exemplary embodiment of an FPGA having multiple ASDSPs thereon, according to several embodiments of the invention.

FIG. 4B illustrates an FPGA 200, according to another exemplary embodiment, wherein FPGA 200 is configured to have three ASDSPs 100c, 100d and 100e placed thereon. As illustrated, ASDSP 100c is connected to shared local memory 130a and external memory 140a. Further, ASDSP 100d is connected to the shared local memory banks 130a and further connected to shared local memory banks 130b. As further illustrated in FIG. 4B, ASDSP 100e is in communication with the shared local memory banks 130b, local memory banks 130c, and external memory banks 140b.

Figure 4C:
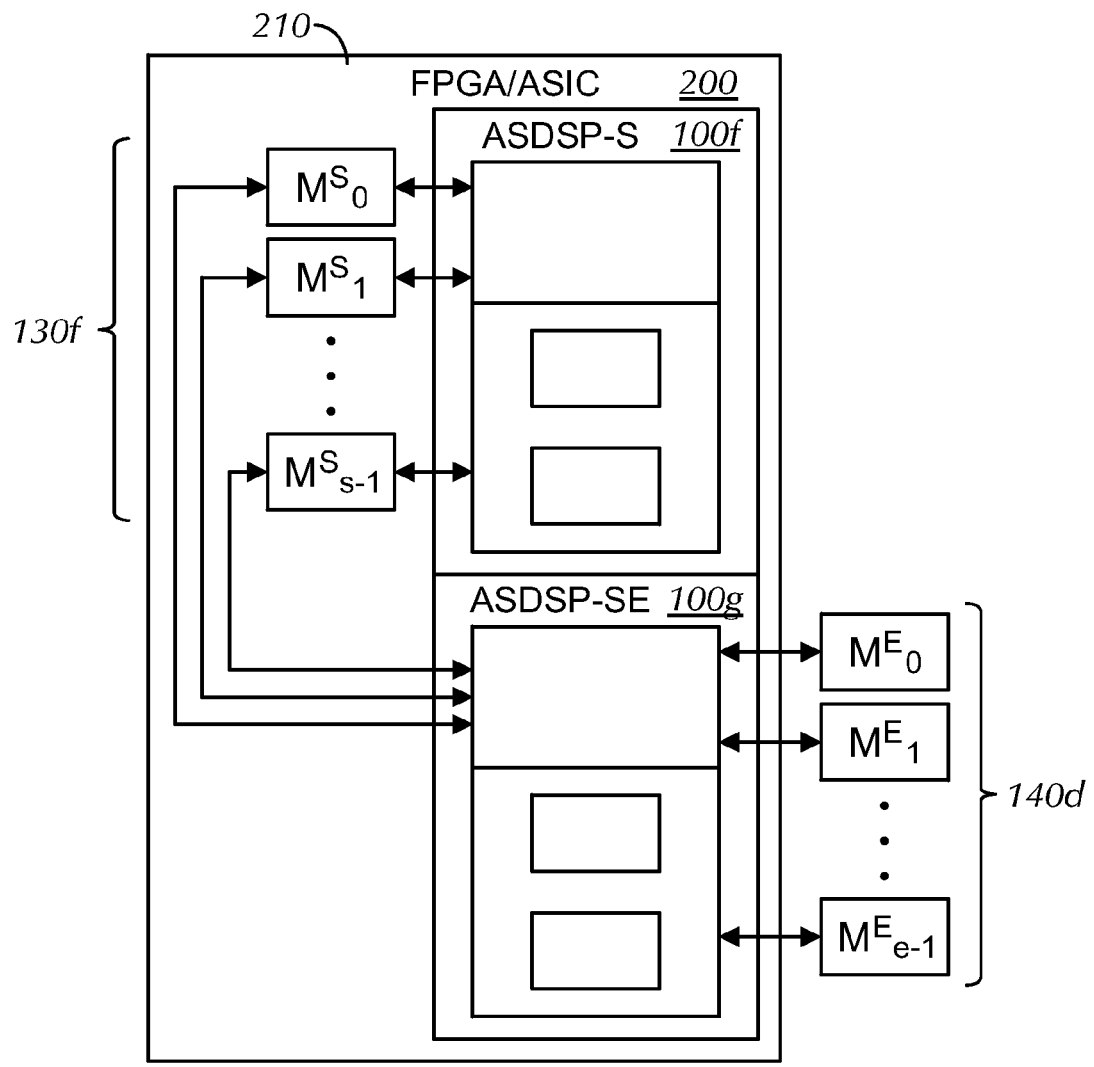
FIG. 4C illustrates a third exemplary embodiment of an FPGA having multiple ASDSPs thereon, according to several embodiments of the invention.
Figure 4D:
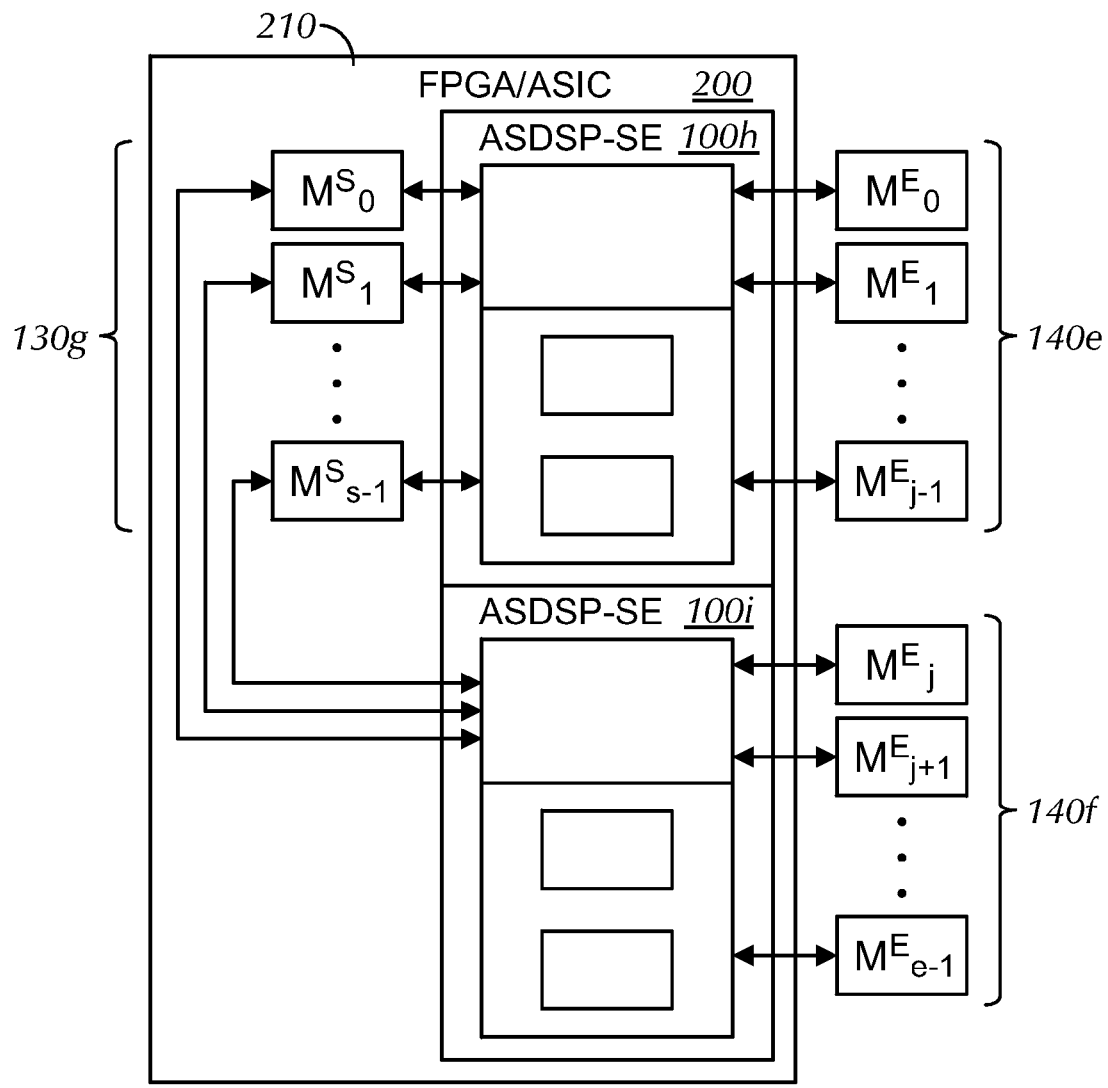
FIG. 4D illustrates a fourth exemplary embodiment of an FPGA having multiple ASDSPs thereon, according to several embodiments of the invention.

FIG. 4C illustrates another embodiment of an FPGA 200 having two ASDSPs 100 thereon. ASDSP 100f is illustrated as being connected to shared local memory banks 130, and ASDSP 100g is also connected to the same shared local memory banks 130, as well as external memory banks 140. Still further, FIG. 4D illustrates yet another exemplary embodiment of an FPGA 200 having two ASDSPs 100h and 100i placed thereon. As illustrated, ASDSP 100h is in communication with shared local memory banks 130 and external memory banks 140a, and ASDSP 100i is further connected to the shared local memory banks 130 and is further connected to external memory banks 140b. It should be noted that the above figures depict exemplary embodiments of the FPGA and different variations of FPGAs 200 having one or more ASDSPs thereon may be used in several embodiments.

In one embodiment, a library of high-performance, digital signal processors is provided wherein each processor executes a specific DSP algorithm. Each processor contains a small instruction set and implements a particular algorithm. In one or more embodiments, these algorithm specific digital signal processors (ASDSPs) are used to mitigate bottlenecks in software by replacing computationally intense portions of a high-level DSP application with custom hardware.

In one embodiment, each ASDSP is individually loaded into a commercially available configurable computing unit for execution. An attractive feature of the system is that a computing unit such as an FPGA can be reprogrammed for theoretically an infinite number of DSP algorithms.

Each of the processors synthesized has a small instruction set which decreases the size and increases the speed of the instruction decode logic. In one embodiment, a back-end compilation system is employed to automate the process of bit stream synthesis. Each bit stream in the library is used to program an FPGA to function as an algorithm-specific digital signal processor.

In one embodiment, a DSP algorithm described in a high-level programming language, e.g. C/C++, is the input to the system. In one or more embodiments, the system transforms the high-level description into a VHDL model of a personalized, high-performance processor that can be generated/synthesized. The generated, personalized processor executes the original algorithm significantly faster than a microprocessor using typical commercial synthesis tools.

In one embodiment, the system first transforms a high-level, behavioral description of a DSP algorithm into a processor level description. In one embodiment, the system transforms a DSP algorithm into a processor description containing instructions tailored to the algorithm. In one or more embodiments, this processor description is transformed into a structural/register-transfer level (RTL) description of the same processor. In one embodiment, once the structural/RTL model of the processor is produced, logic synthesis, and placement and routing may be performed using commercial tools. In one or more embodiments, the result of this process is an FPGA bit stream that is ready to be loaded into the FPGA.

In one or more embodiment, a DSP algorithm is input into the system and used to generate or create a processor level description of a digital signal processor. This intermediate pseudo-VHDL description is transformed into a synthesizable, structural/register transfer level description of the same digital signal processor also specified in VHDL. The final phase of the system involves logic synthesis and placement and routing. In this step, a hardware configuration file or FPGA bit stream is generated to program the FPGA.

The goal of the system is to produce algorithm-specific DSPs that best utilize the available FPGA resources and memories. This is achieved via effective Resource Allocation (RA) and Scheduling that is conducted to minimize the total number of clock cycles required to execute the algorithm. Efficient and high utilization of the available FPGA resources leads to increased processor throughput and increased system performance RA solves the following problem: given the available FPGA area and the number of available memories, define a complete function core that maximizes the utilization of the FPGA area. Finally, scheduling is performed by mapping portions of the DSP algorithm computations onto available time slots in which each function core can be used.

Figure 7:
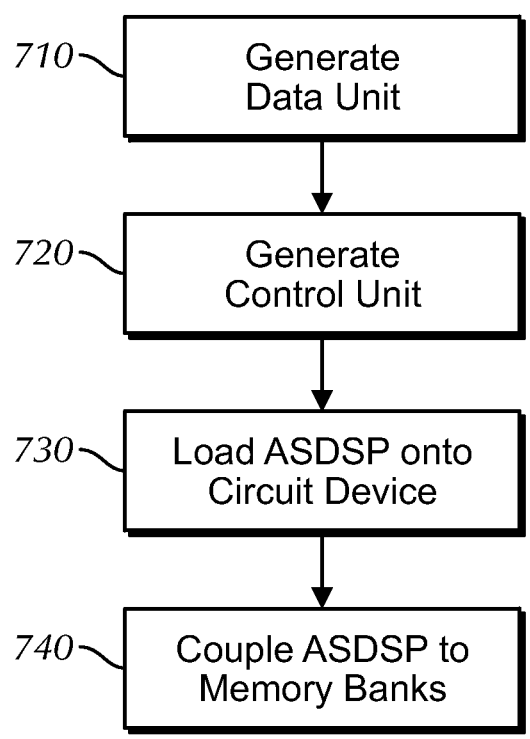
FIG. 7 illustrates a flow diagram of a method for generating an integrated circuit device according to several embodiments of the invention.

FIG. 7 illustrates a flow diagram of a method for implementing an integrated circuit device comprising a multiple memory, Application Specific Digital Signal Processor (ASDSP), according to one or more embodiments.

First in step 710 a data unit is generated. According to several embodiments, the data unit handles the information and comprises standard processor components such as registers, a program counter, an instruction register, memory address registers, counters and/or function cores. In some embodiments, the data unit includes an instruction memory and a function core.

In one embodiment, in step 710 one or more function cores are generated which define the application to be performed by the ASDSP. In one embodiment, as described above, the function core comprises the computational component of the data unit. In one embodiment, implementing the function core comprises receiving a specific DSP algorithm and generating a set of operations to perform the algorithm. In one embodiment, the set of operations are generated such that they best utilize the available FPGA resources and memories. In one embodiment, one or more of the operations are then implemented as a function core of the data unit. In one embodiment, the function core is similar to an arithmetic logic unit (ALU) but it only performs fixed or floating-point operations necessary for the given application. In some embodiments, the function core 124 is highly pipelined, has multiple inputs and outputs, and effectively computes complex arithmetic expressions, composed of lower level primitives, in a single cycle once the pipeline is filled.

In one embodiment, as described above, the function core may be a combination of one or more fundamental function cores, basic function cores and/or complete function cores. In one embodiment, the hierarchical structure of the function core is such that it best utilizes the circuit device resources and materials. As described above, FIG. 5 illustrates an exemplary function core generated in step 710 according to several embodiments, wherein the function core 124 comprises 8 inputs being supplied by registers R0-R7 and a single output Y. In one embodiment, the function core 124 may be pipelined and made up of two or more function cores, similar to the function core as illustrated in FIG. 5. In one embodiment, the function core 124 may have up to n inputs and m outputs depending on the specific function being performed by the function core 124. In one embodiment, each of the inputs and outputs of the function core are 32-bits.

Furthermore, in step 710 an instruction memory is generated as part of the data unit. In one embodiment, the instruction memory comprises one or more instructions from an instruction set. According to one or more embodiments, each instruction found in the instruction memory is fetched, decoded, and executed. In one embodiment, the instruction set contains at least two instructions and is encoded using the minimum number of bits. In such embodiment, one instruction is for the particular application and the other is to halt the processor. The halt instruction returns control of program execution back over to the operating system or the host processor. In some embodiments, the instruction set may further contain instructions for load and store as well as other instructions for performing various other commands and/or functions.

In one embodiment, each application defines it own ASDSP, therefore, the same op-codes can be reused for different instructions. For example, the ASDSPs for implementing the Fast Fourier Transform (FFT) and the Discrete Cosine Transform (DCT) may both contain two instructions with exactly the same op-codes. That is, in some embodiments, two ASDSPs with different function cores can reuse the same op-codes for two extremely different arithmetic expressions. In one or more embodiments, the instruction set op-codes on the ASDSP may be reused entirely or partially for another ASDSP.

In some embodiments, the small instruction set contributes to maximizing system clock speed. Due to the small number of instructions, the instruction decode logic is minimized and does not contribute to the delay on the critical path of the design. In several embodiments, the functionality of the reduced set of instructions is achieved by the use of the application-specific function core.

In several embodiments, the instruction memory is configured as part of the data unit and is separate from the data memory banks. This exemplary configuration allows for faster reads from the instruction memory and therefore contributes to the speed of the ASDSP.

Next, in step 720, a control unit is generated. In one embodiment, the control unit is one or more finite state machines that perform one or more tasks. For example, in one embodiment, the control unit manages memory reads and writes, decodes the instruction, enables the function core to begin once the data is available, signals completion to the host, and/or returns control to the host processor and/or operating system. In one embodiment, the control unit controls the flow of data through the ASDSP 100, managing the scheduling of the simultaneous reads and writes to multiple memory banks. In one embodiment, the control unit provides a constant stream of input data to the function core, while managing the queuing of output data to multiple memory banks. In other embodiments, the control unit additionally or alternatively manages when the function core is active/idle. In one embodiment, the control unit is one or more simple finite state machines that are very similar for ASDSPs with function cores containing the same number of inputs and outputs.

In one embodiment, once step 710 and 720 are completed, ASDSPs are stored in a central processor library. Each ASDSP is stored as an FPGA bit stream. In some embodiments, a module definition file that describes the ASDSP's function and other attributes may be maintained to use the ASDSP on the FPGA board.

In step 730, the data unit and control unit are loaded onto a circuit board of the integrated circuit device, such as for example an FPGA. In one embodiment, one or both the data unit and control unit comprise a bit stream which is configured to be loaded onto the FPGA. It should be noted that while in the exemplary embodiment described above the architecture is implemented on a Field-Programmable Gate Array (FPGA). In other embodiments, the ASDSP may be implemented on a masked programmable gate array or custom integrated circuit (not shown).

In one or more embodiments, the circuit device, e.g. FPGA, comprises a plurality of local memory blocks and may further comprise pins which are coupled to external memory banks. In step 740, the control unit and data unit are directly coupled to several memory banks, including one or more local memory banks (for example memories $M^L_0$-$M^L_{1-1}$ of FIG. 1) and/or external memory banks (for example memories $M^E_0$-$M^E_{e-1}$ of FIG. 1). In one embodiment, the ASDSP is implemented onto an integrated circuit device, comprising a circuit board.

The above method thus generates algorithm/application specific DSPs that best utilize the available FPGA resources and memories. This is achieved via effective Resource Allocation (RA) and Scheduling that is conducted to minimize the total number of clock cycles required to execute the algorithm. Efficient and high utilization of the available FPGA resources leads to increased processor throughput and increased system performance. RA solves the following problem: given the available FPGA area and the number of available memories, define a complete function core that maximizes the utilization of the FPGA area. Finally, scheduling is performed by mapping portions of the DSP algorithm computations onto available time slots in which each function core can be used.

In one embodiment the above method may be implemented through tangible computer-readable storage medium having computer readable instructions stored therein. In some embodiments, the computer readable storage medium stores instructions configured to perform one or more of the steps 710-740 of the above described method when executed by one or more processors.

One or more of the functional units described in this specification may be at least in part implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Various additional details of one or more components that may be included in one or more embodiments are described in the following documents, all of which are incorporated herein by reference: (1) Gloster et al., "Optimizing the Design of a Configurable Digital Signal Processor for Accelerated Execution of the 2-D Discrete Cosine Transform", Proceedings of the $39^{th}$ Hawaii Conference on System Sciences, IEEE 0-7695-2507-5/06, 2006; and (2) Gay, Wanda, "Optimization Tools and Techniques for Configurable Digital Signal Processor Synthesis", Howard University, UMI No. 3331459, ProQuest Publishing, Jan. 27, 2009.

While the invention herein disclosed has been described by means of specific embodiments, examples and applications thereof, numerous modifications and variations could be made thereto by those skilled in the art without departing from the scope of the invention set forth in the claims.

What is claimed is:

1. An integrated circuit device, comprising:
  a circuit board; and
  a field programmable gate array on the circuit board, wherein the field programmable gate array includes one or more digital signal processors implemented therein, each digital signal processor comprising:
    a data unit comprising:
      a function core configured to perform a specific mathematical expression in order to perform at least a portion of a specific application;
      an instruction memory storing one or more instructions configured to send commands to a control unit and the data unit to perform the specific application; and
      a register file comprising a plurality of registers; and
    the control unit configured to control a flow of data between a plurality of memory banks and the function core for performing the specific application; and
  the plurality of memory banks coupled to each of the one or more digital signal processors and comprising at least two or more local memory banks integrated into the field programmable gate array.

2. The integrated circuit device of claim 1, wherein the plurality of memory banks further comprise one or more external memory banks external to the field programmable gate array and coupled to at least one of the one or more digital signal processors.

3. The integrated circuit device of claim 1, wherein the data unit further comprises at least one of a one or more registers such as an instruction register, and a memory address register, and one or more counters such as a program counter.

4. The integrated circuit device of claim 1, wherein the instruction memory comprises at least two instructions.

5. The integrated circuit device of claim 4, wherein the at least two instructions comprise a first instruction for the specific application and a second instruction for halting the digital signal processor.

6. The integrated circuit device of claim 5, wherein the instruction memory further comprises instructions for loading input data for performing the specific mathematical expression, and storing output data of the function core.

7. The integrated circuit device of claim 1, wherein the instruction memory is a part of the data unit and is separate from the plurality of memory banks coupled to the data unit.

8. The integrated circuit device of claim 1, wherein the function core performs one or both of fixed point operations and floating point operations.

9. The integrated circuit device of claim 1, wherein the function core comprises one or more inputs for receiving input data for performing the specific mathematical expression, and further comprises one or more outputs comprising a result of the specific mathematical expression performed.

10. The integrated circuit device of claim 1, wherein the function core comprises a plurality of function cores, each performing a portion of the specific mathematical expression.

11. The integrated circuit device of claim 1, wherein the function core is configured such that an output is provided for the specific mathematical expression at every clock cycle.

12. The integrated circuit device of claim 1, wherein the one or more digital signal processors comprise at least two digital signal processors integrated into the field programmable gate array,
   wherein the plurality of memory banks comprise at least one shared memory bank, such that the at least two digital signal processors share the at least one shared memory bank.

13. The integrated circuit device of claim 12, wherein the at least one shared memory bank comprises a local memory bank integrated into the field programmable gate array.

14. The integrated circuit device of claim 12, wherein the at least one shared memory bank comprises an external memory bank external to the field programmable gate array and coupled to the at least two digital signal processors.

* * * * *